United States Patent
Asao et al.

(10) Patent No.: US 9,760,694 B2
(45) Date of Patent: Sep. 12, 2017

(54) METHOD AND RELATED APPARATUS FOR GENERATING ONLINE AND PRINTING ON-DEMAND COMPILATION OF WORKS WITH EXCERPTS HANDLING FEATURES

(75) Inventors: David Asao, Irvine, CA (US); Daniel Barber, Tustin, CA (US); Philip Wu, Seal Beach, CA (US); Toshiro Fujimori, Laguna Beach, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 13/426,580

(22) Filed: Mar. 21, 2012

(65) Prior Publication Data

US 2013/0254243 A1    Sep. 26, 2013

(51) Int. Cl.
*G06F 7/00* (2006.01)
*G06F 21/10* (2013.01)
*G06Q 10/10* (2012.01)

(52) U.S. Cl.
CPC .......... *G06F 21/10* (2013.01); *G06Q 10/101* (2013.01)

(58) Field of Classification Search
CPC .............. G06F 21/10; G06F 2211/007; G06F 2211/008; G06F 2221/2119; H04L 63/0428; H04L 2463/103; H04L 2209/60
See application file for complete search history.

(56) References Cited

U.S. PATENT DOCUMENTS

| | | | | |
|---|---|---|---|---|
| 5,530,520 A | * | 6/1996 | Clearwater | G03G 15/507 358/462 |
| 5,715,381 A | * | 2/1998 | Hamilton | G06F 3/1204 358/1.15 |
| 6,826,546 B1 | * | 11/2004 | Shuster | G06Q 30/06 705/52 |
| 6,917,436 B2 | * | 7/2005 | Bates | G06F 3/1204 358/1.14 |
| 7,092,963 B2 | * | 8/2006 | Ryan et al. | |
| 7,386,569 B2 | * | 6/2008 | Berstis | G06F 17/30011 |
| 7,415,617 B2 | * | 8/2008 | Ginter | H04L 9/3263 348/E5.006 |
| 2005/0192820 A1 | * | 9/2005 | Simon et al. | 705/1 |
| 2005/0216528 A1 | * | 9/2005 | Cheng | G06F 17/30067 |
| 2006/0075327 A1 | * | 4/2006 | Sriver | 715/501.1 |
| 2006/0235855 A1 | * | 10/2006 | Rousseau et al. | 707/100 |
| 2007/0083762 A1 | * | 4/2007 | Martinez | 713/176 |
| 2007/0242303 A1 | * | 10/2007 | Barry | G06F 3/1212 358/1.15 |
| 2007/0256011 A1 | * | 11/2007 | Jones | G06F 17/248 |
| 2009/0273800 A1 | * | 11/2009 | Morales | 358/1.15 |
| 2009/0299871 A1 | * | 12/2009 | Carro | G06F 21/10 705/26.1 |
| 2011/0038597 A1 | * | 2/2011 | McCallister | H04N 5/262 386/239 |
| 2011/0225550 A1 | * | 9/2011 | Creedon | G06F 17/30572 715/841 |

(Continued)

*Primary Examiner* — Hasanul Mobin
(74) *Attorney, Agent, or Firm* — Chen Yoshimura LLP

(57) ABSTRACT

A method and related apparatus for managing files for producing a compilation of works, including the step of obtaining a complete file of a work to be compiled in the compilation of works, selecting a portion of the complete file as a separate excerpt file to be compiled in the compilation of works, and independently managing the complete file and the excerpt file for producing the compilation of works.

10 Claims, 16 Drawing Sheets

(56) References Cited

U.S. PATENT DOCUMENTS

2012/0197952 A1* 8/2012 Srinivasaraghavan . G06F 21/10
707/825
2012/0278381 A1* 11/2012 Ferlitsch et al. .............. 709/203

* cited by examiner

METHOD AND RELATED APPARATUS FOR GENERATING ONLINE AND PRINTING ON-DEMAND COMPILATION OF WORKS WITH EXCERPTS HANDLING FEATURES

BACKGROUND OF THE INVENTION

Field of the Invention

This invention generally relates to a method and related apparatus for generating online and printing on-demand compilation of works, and in particular, it relates to managing contents and assembling articles into booklets with excerpts handling features.

Description of Related Art

The rapid development of new printing and telecommunication technologies has made it possible to generate and provide customized compilation of works in printed or other electronic forms on a print-on-demand (POD) basis, which generally refers to production of commercial-quality finished products in printed or electronic forms such as books and compilation booklets on a relatively small scale, typically by a professional print shop, at the request of customers.

One example of generating and producing compilations of works may be that in many educational institutions, a teacher or professor often needs to assemble a group of works and compile them into a volume of course materials. Another example may be that in a business entity or an organization, an instructor or trainer needs to assemble a group of works and compile them into a booklet of training materials. Such works may include previously published papers or articles, images and graphics etc. which may be available in hard copies traditionally but now increasingly in electronic (digital) formats, such as in the portable document (PDF) format. These works may include PDF files in the teacher or instructor's own collection, e.g., stored in his or her own computer storage device such as a hard disc drive, or in a file folder assigned to him or her on a server of the institution or organization. These works may also include PDF files in other third parties' collections, e.g., stored in the third parties' servers and may be accessed via a computer network such as the Internet by using uniform resource locator (URL) links.

Once the teacher or instructor selects the PDF files, they can be assembled together to generate a compilation of works. After a compilation of works is generated into a volume or booklet of articles, students or organization members may purchase the volume or booklet by placing POD orders with a print shop that can print and deliver the volumes or booklets to the students or members.

However, oftentimes it is desirable to include an excerpt of an article in a booklet with or without the entire article. There is a need to provide a more efficient and cost-effective method and related apparatus for online generation and purchase of compilations of works on a POD basis with the features for handling adding excerpts of certain works into the compilation.

SUMMARY

The present invention is directed to a method and related apparatus for generating and printing compilations of works, which provides a more efficient and economical online platform for easily managing contents and assembling articles into booklets that can be readily ordered and printed on-demand, with excerpts handling features for adding excerpts of certain works into the compilation.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for managing files for producing a compilation of works, including the step of obtaining a complete file of a work to be compiled in the compilation of works, selecting a portion of the complete file as a separate excerpt file to be compiled in the compilation of works, and independently managing the complete file and the excerpt file for producing the compilation of works.

In another aspect, one exemplary embodiment of the present invention further provides a computer program product that causes a data processing apparatus to perform the above methods. The computer program product includes a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIGS. 4-16 illustrate screen shots from executing various steps of the exemplary process for online management of contents as shown in FIG. 3.

DETAILED DESCRIPTION OF PREFERRED EMBODIMENTS

Embodiments of the present invention provide a more efficient and cost-effective method and related apparatus for online management, generation and purchase of compilations of works on a print-on-demand (POD) basis.

As an example of practical scenarios of the need for managing, generating and printing compilations of works, a teacher or professor in an educational institution may need to assemble educational materials for the students to order and purchase. As another example of practical scenarios of such need, an instructor or trainer of a business entity or organization may need to assemble training materials for the members to order and purchase.

Figure 1:
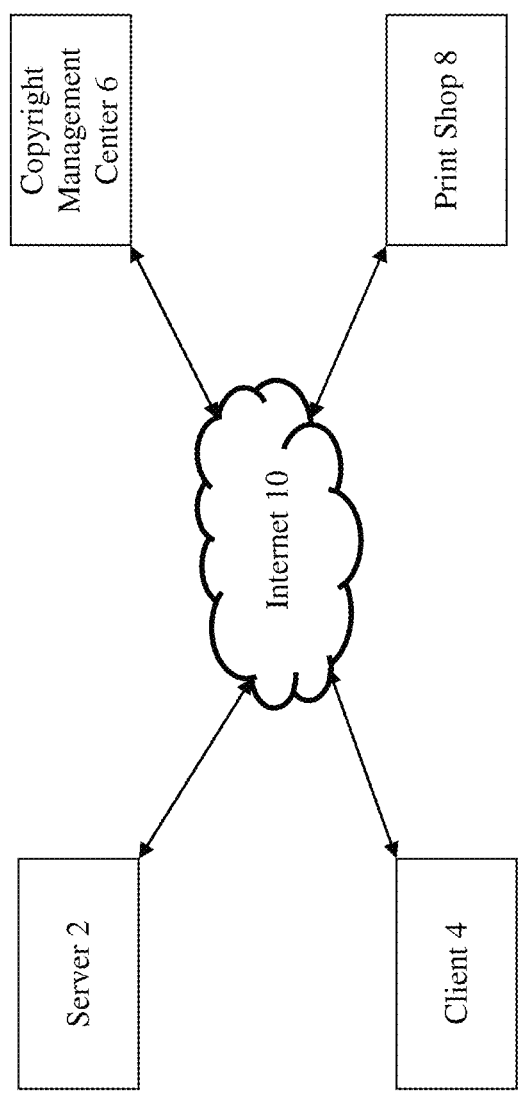
FIG. 1 schematically illustrates an exemplary online environment in which embodiments of the present invention may be implemented.

Referring to FIG. 1, there is schematically illustrated an exemplary online environment in which embodiments of the present invention may be implemented. The exemplary online environment includes a server 2, a client computer 4, one or more copyright management center servers 6, and a print shop server 8, connected via one or more computer network 10 such as the Internet or other communication links. A client (such as a teacher or a trainer, or a student or a member of an organization) uses the client computer 4 to interact with the server 2. The server 2 executes a computer program stored in a memory to perform processes according to the embodiments of the present invention. The copyright management center servers 6 stores digital contents and associated copyright data or license information that may be obtained for use by the clients. The print shop may be a professional print shop equipped with printers and various other image reproduction machines for producing printed products such as books, booklets, etc. The print shop server 8 manages the print jobs submitted to the print shop by the clients or customers.

The server 2 generally provides an integrated service that allows a client to search and acquire contents from content sources, to compile them into an electronic file and submit the compiled file to a POD service to produce a printed product, and to order and purchase the printed product of the compiled works. The clients may access the server 2 from their own computers 4 via the network 10 once they establish their user accounts on the server 2. The server 2 may interact with the copyright management center server 6 for searching and obtaining contents of the works to be compiled. The server 2 may also interact with the print shop server 8 for printing and delivering the compiled works in hard copy or electronic forms.

In this application, the term "copyright management center" generally refers to a place or service that facilitates the management and distribution of copyrighted materials and the obtaining and transferring of payment to copyright holders. Typically, a copyright management center facilitates legitimate access to copyrighted content by providing a copyright registry, where users can locate copyright information about a work, by also providing a copyright marketplace exchange, where users can buy and sell copyrights, and by further providing a copyright clearance service that can connect with third party distribution platforms. Examples of such copyright management centers may include digital repository of published work maintained by some publishers or digital libraries maintained by various organizations. Another example of copyright management center is the Copyright Clearance Center.

Therefore, "copyright management center 6" of the online environment shown in FIG. 1 may include any types of sources of digital contents and their copyright data and license information. More generally, "copyright management center 6" of the online environment shown in FIG. 1 may also include any third party content sources such as databases or depositories where hard or electronic copies of articles, publications or other contents and works may be stored or otherwise kept.

The physical locations or the commercial relationship among the various components of the online environment shown in FIG. 1 are not important. For example, the server 2 may be operated by the copyright management center, or the print shop, or a separate institution, organization or commercial establishment.

Also in this application the term "client" generally refers to a customer or anyone who uses the method or related apparatus provided by the embodiments of the present invention. For example it may refer to a teacher or student in an educational institute, or an instructor or a member in an organization. Specifically for the process described in this application, "client" may refer to "booklet compiler" and "booklet reader", where "booklet compiler" (or "compiler") refers to anyone who manages the contents or articles, and generates compilation of works from the contents or articles, and "booklet reader" (or "reader") refers to anyone who orders the printing or purchases the finished product of the compilation of works that have already been generated. For example, a compiler may be a teacher in an educational institute or an instructor of an organization, whereas a reader may be a student in the educational institute or a member of the organization.

Both the compilers and the readers may have access accounts at the server 2 and share some common rights or features on the server 2, but some of their other rights may be different. For example, a compiler may have right to generate a booklet from compilation of works, whereas a reader may not have such right but may have right to order prints of the booklet. These details will become more apparent and clear in the description below.

As mentioned earlier, in one aspect the present invention is embodied a computer program product that causes a data processing apparatus to perform the methods of the present invention. The computer program product includes a computer usable non-transitory medium (e.g. memory or storage device) having a computer readable program code embedded therein for controlling a data processing apparatus, where the computer readable program code is configured to cause the data processing apparatus to execute the method of the present invention. The computer readable program code includes many functional modules and the essential ones that are closely related to the steps of the process described below are exemplarily shown in FIG. 2.

Figure 2:
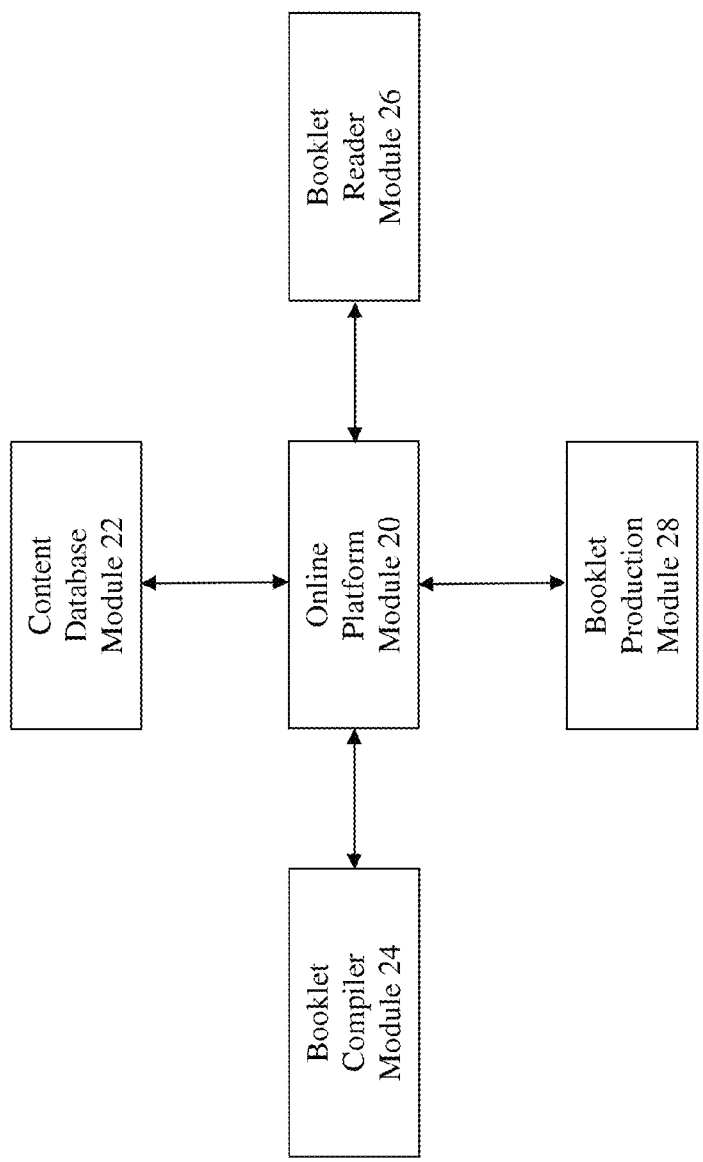
FIG. 2 schematically illustrates an exemplary computer program architecture in which embodiments of the present invention may be implemented.

Referring to FIG. 2, there is schematically shown an exemplary computer program architecture in which embodiments of the present invention may be implemented. The computer program architecture shown in FIG. 2 includes functional modules that are essential and closely related to the steps of the process according to the present invention.

More specifically, there is shown an online platform module 20 that controls and executes the operations at the server 2 (and/or the print shop server 8) shown in FIG. 1 for providing an online platform to implement the relevant steps of the present invention process, including but not limited to, providing a user interface (UI) to the clients, providing clients account and access management on the server 2, providing folder structure and data storage management to the clients on the server 2, and providing online ordering and payment capacities on the server 2, etc.

There is also shown in FIG. 2 a booklet compiler module 24 that controls and executes the operations at the customer's computer 4 or server 2 (and/or the server at copyright management center 6) shown in FIG. 1 for providing access to server 2 by a compiler, managing the compiler's account information at the server 2, managing the file folders assigned to the compiler, creating and editing booklets, ordering booklets and paying online, etc.

There is further shown in FIG. 2 a booklet reader module 26 that controls and executes the operations at the customer's computer 4 or server 2 (and/or the server at copyright management center 6) shown in FIG. 1 for providing access to server 2 by a reader, managing the reader's account information at the server 2, browsing and searching for booklets, ordering booklets and paying online, etc.

In addition, there is shown in FIG. 2 a booklet production module 28 that controls and executes the operations at the server 2 (and/or the server at print shop 8) shown in FIG. 1 for processing print orders made at the online platform 20, processing payment for purchases of booklets, making print job orders, transmitting electronic files of the booklets to the print shop server 8, and handling production, assembly and delivery of booklets, etc.

It is understood that the exemplary computer program architecture in which embodiments of the present invention may be implemented may include other functional modules not shown in FIG. 2 that facilitates the execution of the steps of the process in accordance with the method of the present invention.

Figure 3:
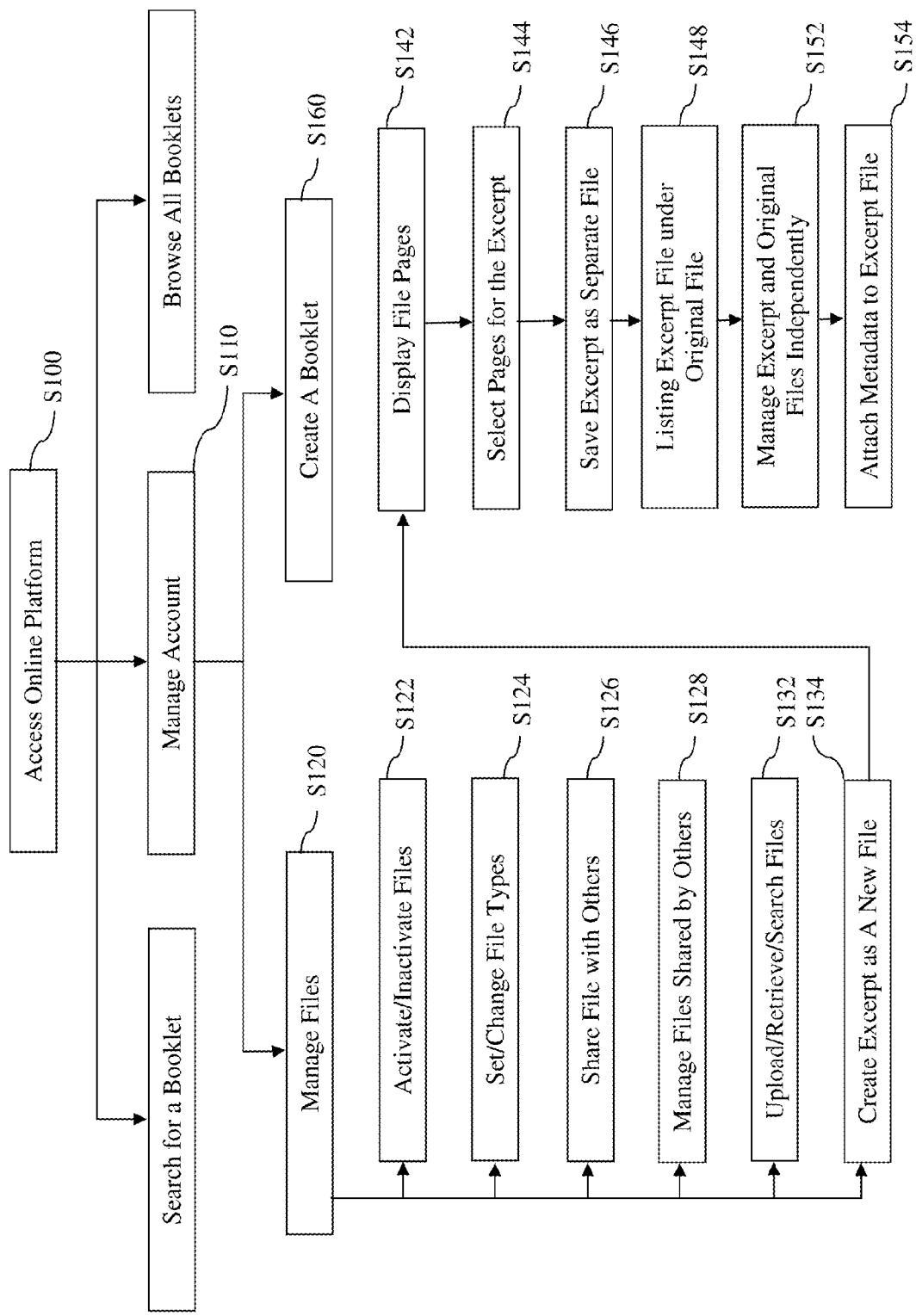
FIG. 3 schematically illustrates an exemplary process for online management of contents and generation of booklets as parts of a computer-implemented method for generating and printing compilations of works in accordance with an embodiment of the present invention.

Referring to FIG. 3, there is shown a schematic illustration of an exemplary process for online management of contents and generation of booklets as parts of a computer-implemented method for generating and printing compilations of works in accordance with an embodiment of the present invention. Generally the steps shown in FIG. 3 reflect the steps that a compiler will take to manage the files and create booklets on the server that provides the online platform, e.g., server 2 shown in FIG. 1. Of course anyone who has the access to the server and authority to manage file folders assigned to him or her on the server can take these steps to manage his or her files on the server, not necessarily a compiler.

As Step S100 shown in FIG. 3, the compiler accesses the online platform by, e.g., access the web-site of the online platform. The compiler typically needs to provide a valid username and a matching password to log in.

Figure 4:

Referring to FIG. 4, there is shown a screen shot of an exemplary user interface (UI) display of the home page of the online platform web-site, in this example an online bookstore, after the compiler logs into the web-site. From this home page the compiler may search for a booklet by click on "Search Now" at the lower left portion of the screen, access his or her account by click on, e.g., "My Account" at either the top menu bar or the lower middle portion of the screen, or browse all booklets by click on, e.g., "Browse" at either the top menu bar or the lower right portion of the screen.

At Step S110 shown in FIG. 3, the compiler may access his or her account by clicking on, e.g., "My Account" at either the top menu bar or the lower middle portion of the screen shown in FIG. 4. This will take the compiler to the "Account Overview" page as shown in FIG. 5.

Referring to FIG. 5, there is shown a screen shot of an exemplary UI display of the "Account Overview" page of the online platform web-site. On this page the compiler may see a list of the booklets that have been generated or are in progress, and also the status of all orders placed by the compiler. On the booklet list, each booklet is listed with its name, date of creation, its brief description, and its status. For example, a booklet in progress may be listed as "incomplete" (in progress), "ready" (generated but not activated for ordering), or "active" (activated for ordering). Under the "actions" menu heading at the end of the book list, there are icons for actions that may be taken on each of the booklet. For example, the action icons may include an icon for editing the booklet information, an icon for editing the booklet files, an icon for editing print options, and an icon for activating/deactivating the booklet.

On the left portion of the "Account Overview" page shown in FIG. 5, the compiler may click on the "File Manager" link to manage his or her files, or click on the "Create A Booklet" link to generate a booklet. The compiler may also click on the "Manage Personal Information" link to edit his or her personal information, or click on the "Shopping Cart" link to check out the items he or she intends to order.

At Step S120 shown in FIG. 3, the compiler performs file management tasks by clicking on the "File Manager" link as shown in FIG. 5. This will take the compiler to the "File Manager" page of the online platform web-site as shown in FIG. 6.

Figure 6:
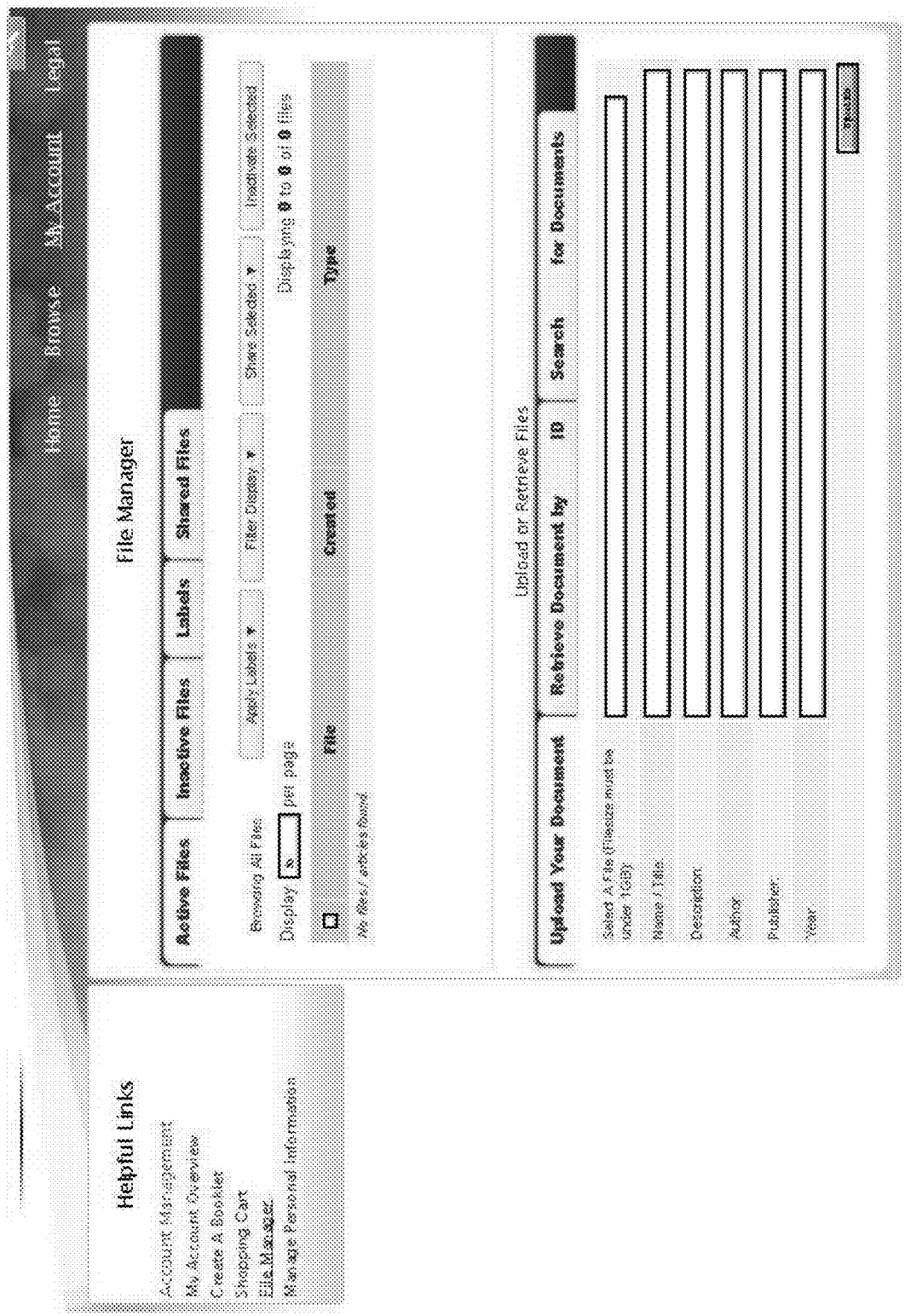

Referring to FIG. 6, there is shown a screen shot of an exemplary UI display of the "File Manager" page of the online platform web-site. On this page the compiler may see a list of his or her files stored on the server, and upload or retrieve files. The main menu bar has buttons that allow the compiler to list "Active Files" that are made active (i.e., can be used in a booklet or shared), "Inactive Files" that remain inactive, "Labels" that are used to label the files, and "Shared Files" that are shared by other colleagues of the compiler.

Figure 7:
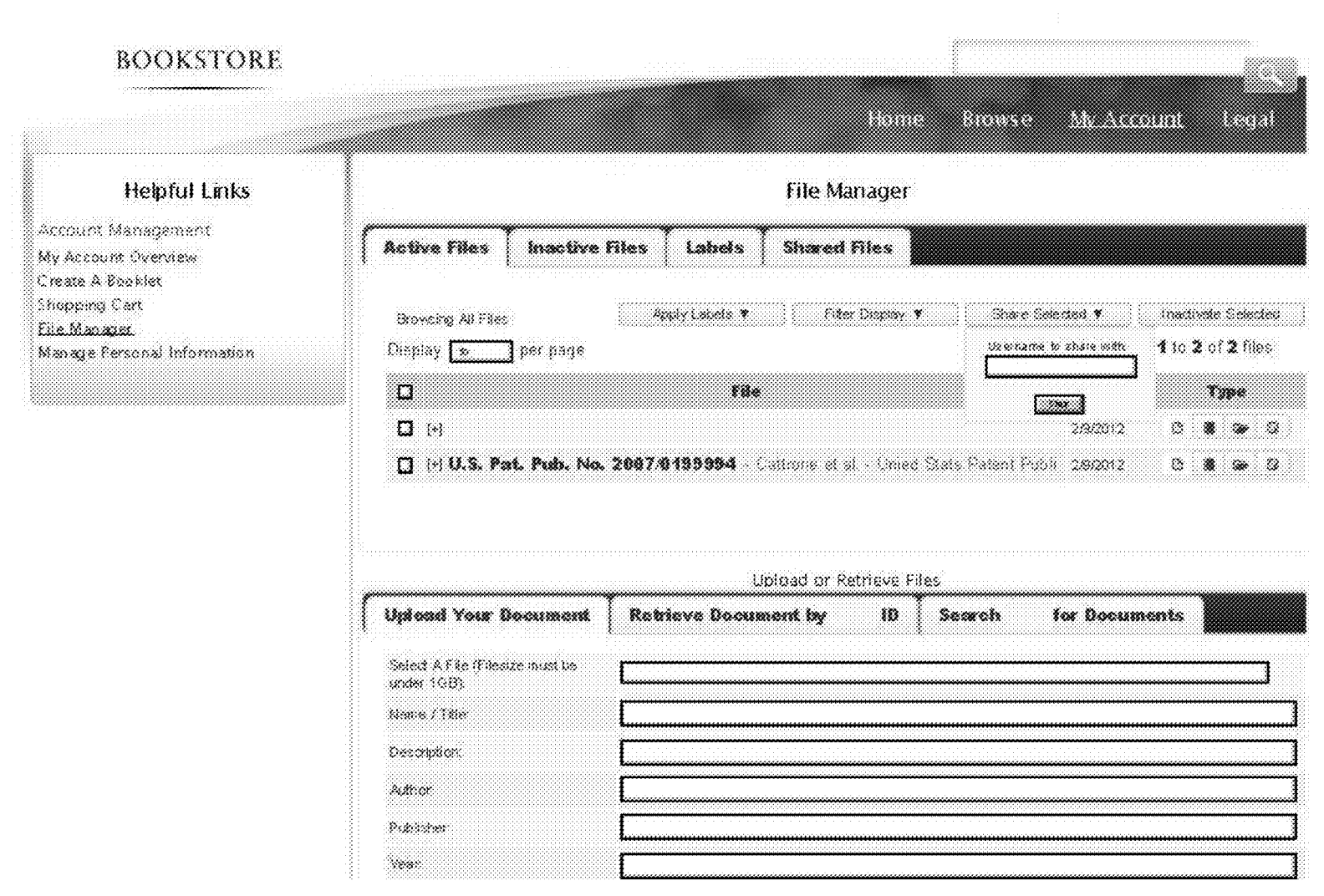

Referring to FIG. 7, there is shown a screen shot of an exemplary UI display of the "Active Files" page of the online platform web-site, upon which the active or activated files are listed. Using the supplemental menu bar under the main menu bar, the compiler may apply labels to the files, using filters to display files according to their labels, share selected files with the compiler's colleagues, and deactivate selected files.

One or more files may be activated or deactivated by the compiler at Step 122 shown in FIG. 3. An active file may be deactivated by clicking on the small square box in front of its name and then click on the "Inactivate Selected" button. As mentioned above, active files may be the files that are or will be used in booklets or shared with others. Inactive files may be the files that are not used or to be used in any booklet. However, inactive files may not necessarily be deleted yet. A list of all inactive files may be viewed by clicking on the "Inactive Files" button on the top main menu of the "File Manager" page, as shown in FIG. 8.

Figure 8:
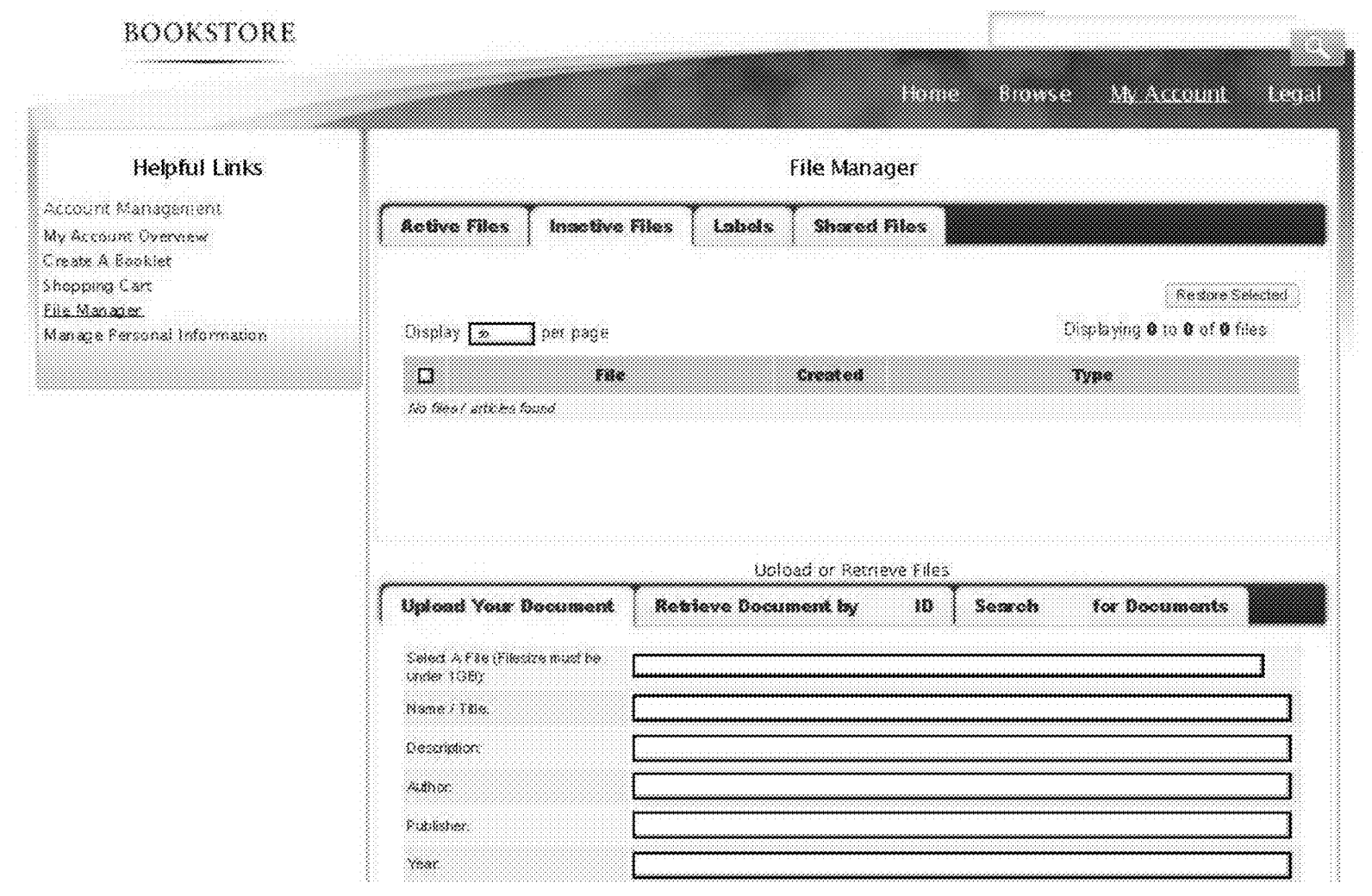

Referring to FIG. 8, inactive files are listed in similar fashion as active files, and therefore not described in detail here to avoid redundancy. An inactive file may be restored back into an active file by first click on the small square box in front of the file name and then click on the "Restored Selected" button.

Referring back to FIG. 7, each file may be shown in a one-line view only with its name and the date of creation, or in an expanded view by clicking on a small plus sign icon in front of the file name. In the expanded view the small plus sign icon changes into a small minus sign icon. Clicking on the small minus sign icon will return back to the one-line view.

Particularly, at Step S124 shown in FIG. 3, the compiler may set and/or change file types to each of the active file listed, by clicking on the icons at the end of each file listed under the heading "Type" as shown in FIG. 7. These file type icons may include, for example, an icon for setting the file as a normal article, an icon for setting the file as a table of contents, an icon for setting the file as a cover page, and an icon for setting the file as a non-paginated file. The file types can be used when the file is used for generating a booklet to correctly position the file within the booklet. By clicking on one of these file type icons, the type of the file can be easily set or changed.

In addition, the compiler at Step S126 shown in FIG. 3 may share a selected file with one or more of his or her colleagues by first clicking on the small square box in front of the file name and then click on the "Share Selected" button in the supplement menu bar, upon which a small dialog box will be displayed as seen in FIG. 7 which allows the compiler to fill in the name of the colleague with whom the compiler desires to share the selected file. Sharing a selected file with a colleague will grant right to the colleague to view and use the file when the colleague creates his or her booklet.

Figure 9:
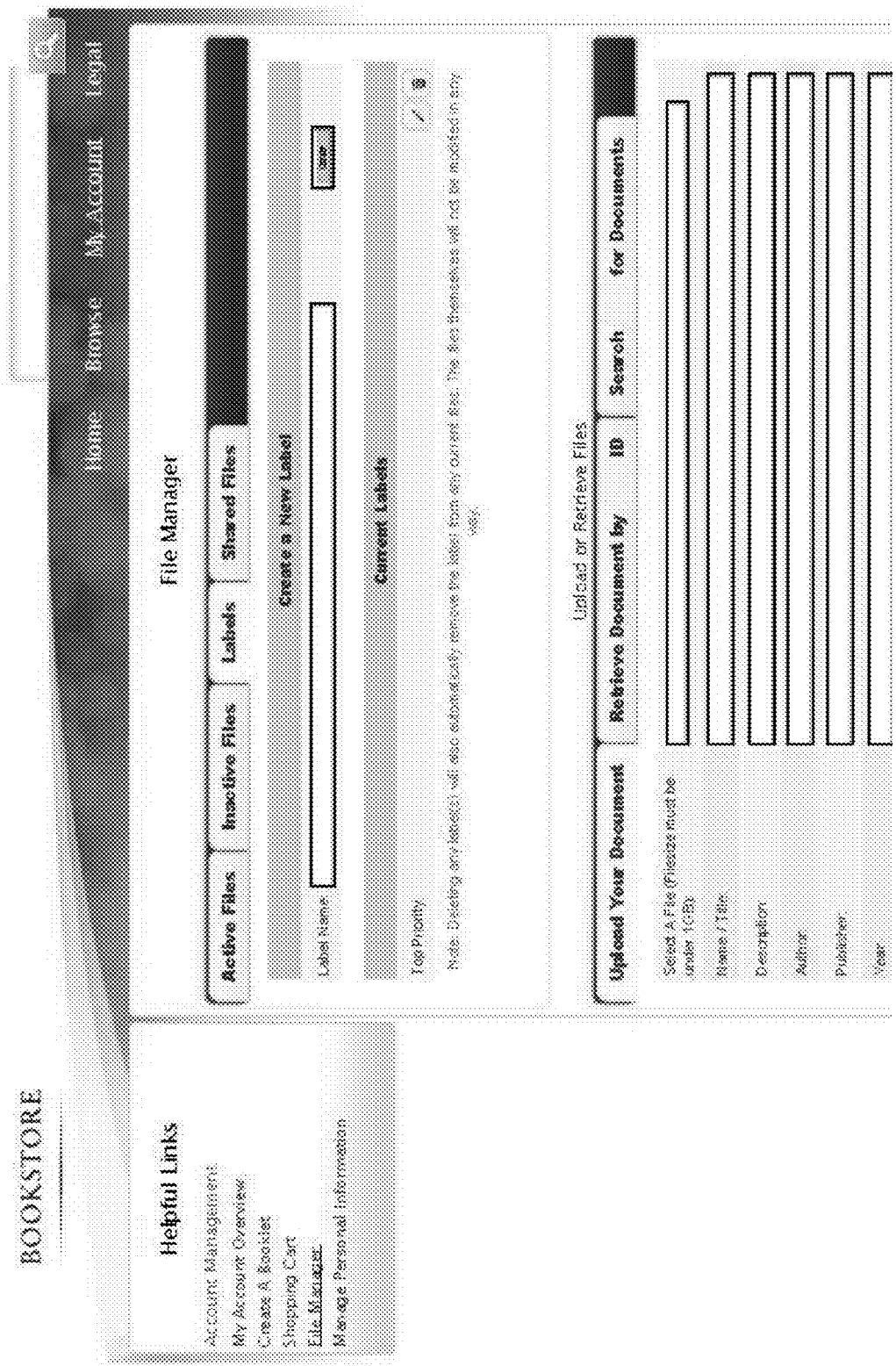

Referring to FIG. 9, labels may be viewed and managed by click on the "Labels" button in the top main menu of the "File Manager" page. Currently used labels, for example "Top Priority", are listed. Each label may be edited or deleted by clicking on respective icons at the end of the label name. New labels may be created by typing in a new label name in a text box provided above the list of the labels.

Moreover, the compiler at Step S128 shown in FIG. 3 can manage the files shared with him or her by his or her colleagues. By clicking on the "Shared File" button in the top main menu bar of the "File Manager" page, a page listing all filed shared by others will be displayed, as shown in FIG. 10.

Figure 10:
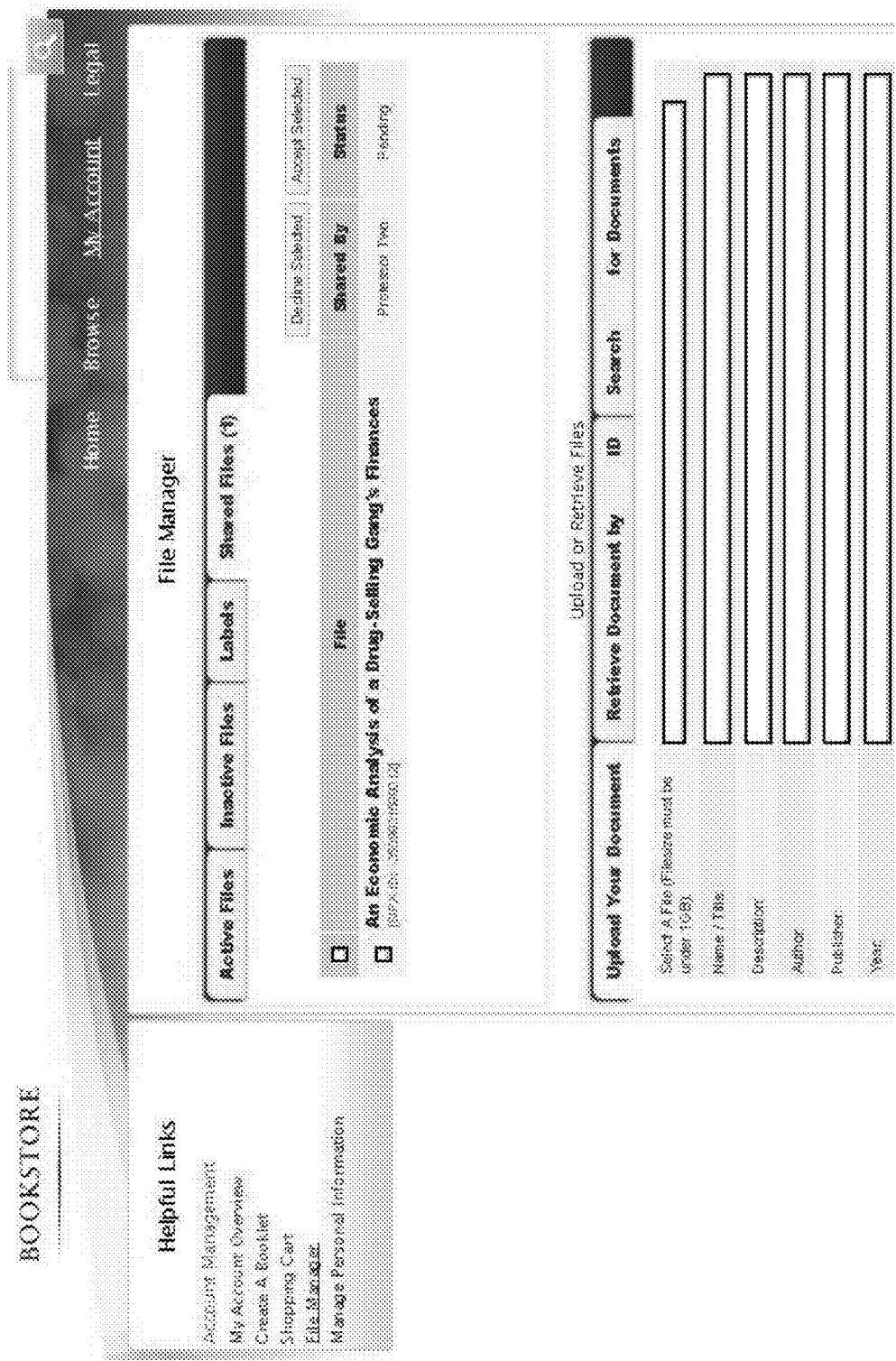

Referring to FIG. 10, files that are shared by others are listed. It is noted that these are not the files that are shared by compiler with others. Rather, these are the files that are shared by others with the compiler. As the example in FIG. 10 shows, it is indicated under the heading "Shared By" that the file listed therein is shared by "professor two" who has shared this file with the compiler. The status of file is indicated under the heading "Status". The compiler may click on the small square box in front of the name of a file listed to select it, and then either decline his or her colleague's offer of sharing the selected file with the compiler, or accept the offer. This can be done by clicking on the "Decline Selected" or "Accept Selected" button respectively. Before the compiler declines or accepts the offer of sharing a file by others, the status of the shared file is indicated as "pending". After the compiler declines or accepts the offer of sharing a file by others by first selecting the file and then clicking on the "Decline Selected" or "Accept Selected" button respectively, the status of the file will change to "Declined" or "Accepted" accordingly.

The compiler at Step 132 shown in FIG. 3 may upload, retrieve or search files from the File Manager page. Referring back to FIG. 6, by clicking on the "Upload Your Document" button, the compiler may select a file stored locally, e.g. on the hard drive of his or her local computer or laptop such as client computer shown in FIG. 1, enter information about the file, e.g., the name/title, description, author, publisher, year of publication, etc., and then upload the file to the file folder assigned to the compiler at the online platform server such as server 2 shown in FIG. 1. Once the file is uploaded, the compiler may manage it with all other files in the compiler's file folder as described above.

Figure 11:
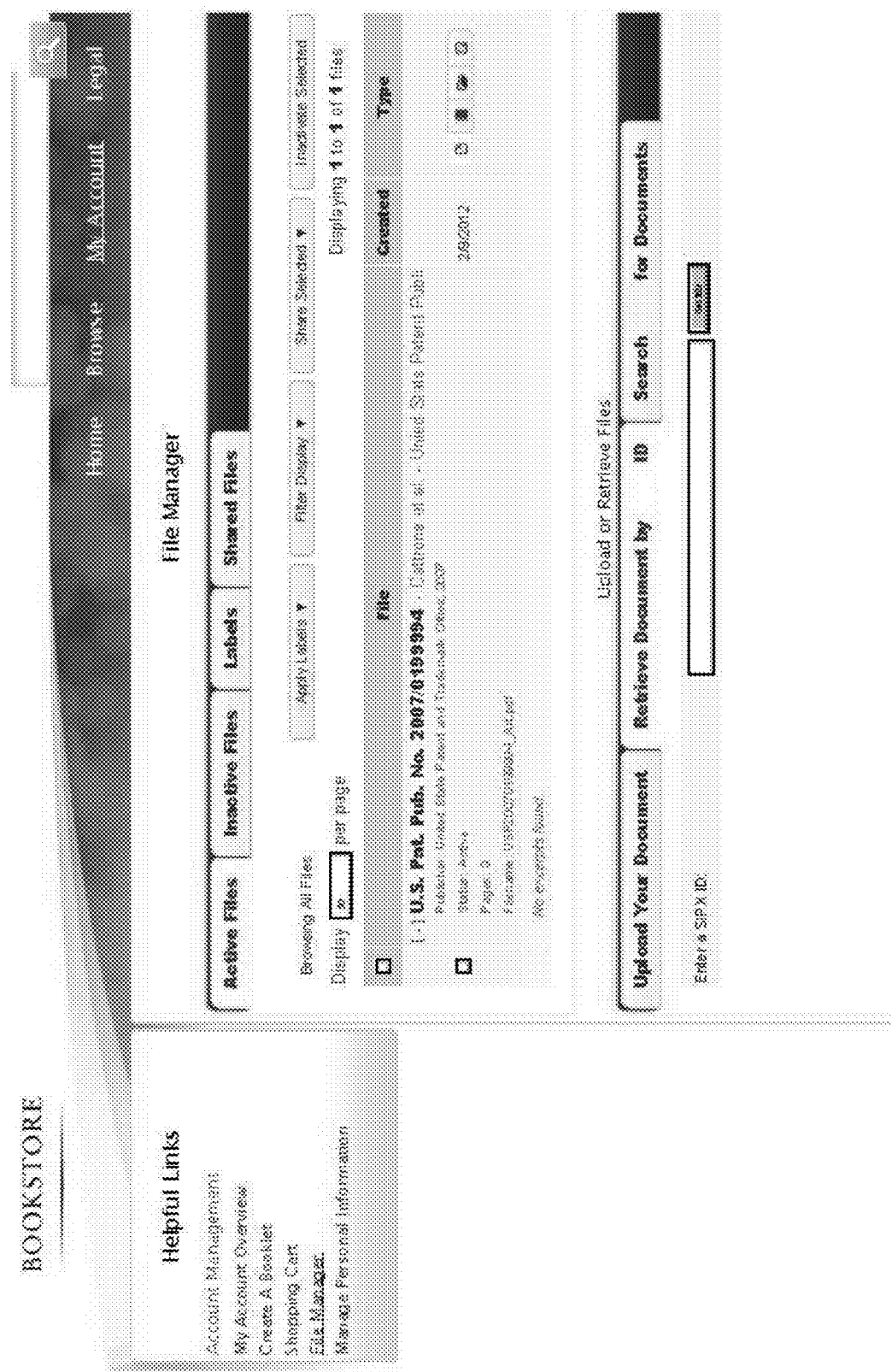

Referring to FIG. 11, the compiler may retrieve a document from a database maintained by, e.g., the copyright management center 6 shown in FIG. 1. In the screen shot shown in FIG. 11 the compiler may enter a document ID of an article if the compiler knows the ID of the article, and retrieve it from the copyright database.

Referring to FIG. 12, when a document is found with the ID provided, its information will be displayed to the compiler, including the title, author, year of publication, publisher, and cost. If this is the right file, then the compiler can click on the "Use This File" button and the retrieved file will be placed in the compiler's file folder. Alternatively, if the compiler realizes from the information provided that he or she has a previously obtained and better version of the same document, the compiler may use his or her own version of the document by uploading his or her own version of the document but using the document information provided by the database so that matching document information and other available information such as copyright license and royalty information are re-associated with the uploaded version. If the retrieved file is not the document wanted by the compiler, a new search may be conducted by clicking on the "New Search" button. It is understood that other copyright management center database or other third party databases may be used for retrieving an article, document or file.

Figure 13:
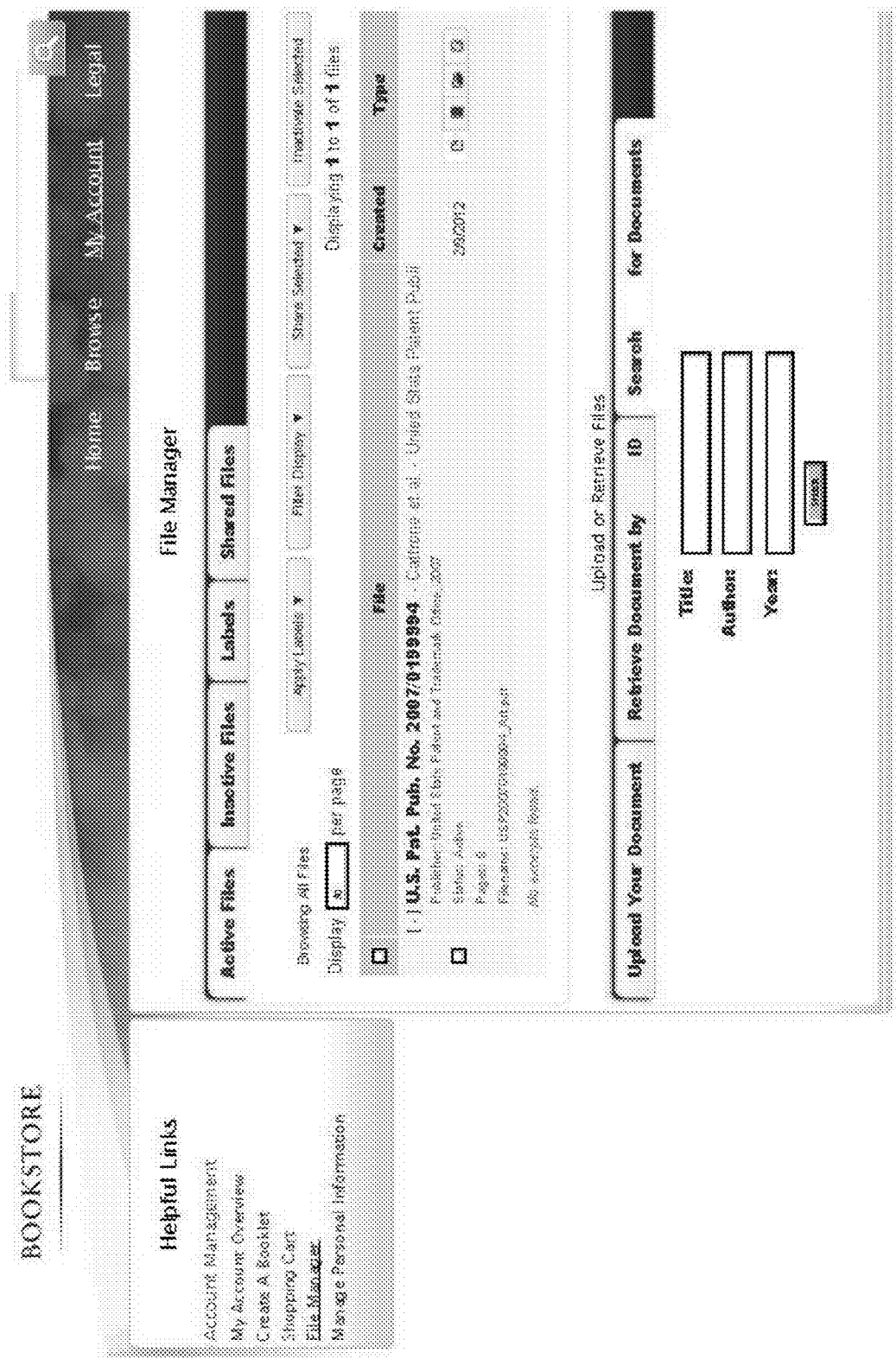

Referring to FIG. 13, the compiler may search for a document from a database if the compiler does not know the document ID assigned or used by the database. The compiler may enter the title, author, and/or year of publication of the document, and a search will be conducted within the database. If the document is found, a screen similar to the one shown in FIG. 12 will be displayed and the compiler may use that document, use his or her own version of the document if so desired, or search for another document, as more fully described above.

Figure 14:
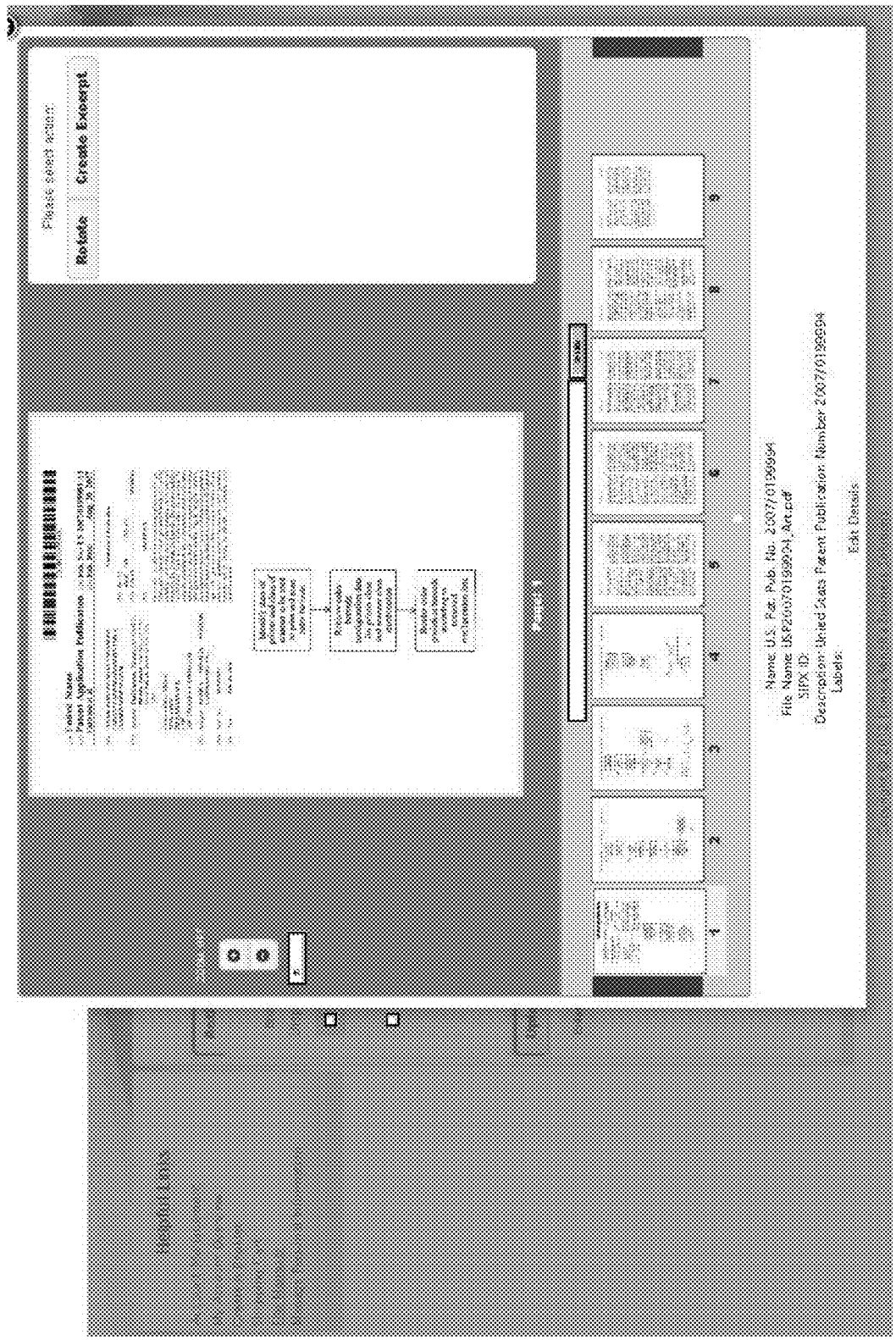

Referring back to FIG. 7, the compiler may click on the name of any file listed in the list to display the contents of the file page by page, as seen in FIG. 14.

Referring to Page 14, there is shown an exemplary UI display of the full page contents of a file in the compiler's folder. Small thumbnail images are displayed with scroll bars at the lower portion of the page, along with detailed information of the file which may be edited by clicking on the "Edit Details" button. In the main window at the upper portion of the page, a large full image of a selected page is displayed, which may be zoomed in and out. The page may also be rotated to be viewed in a correct orientation by clicking on the "Rotate" button at the upper right corner of the page.

Figure 15:
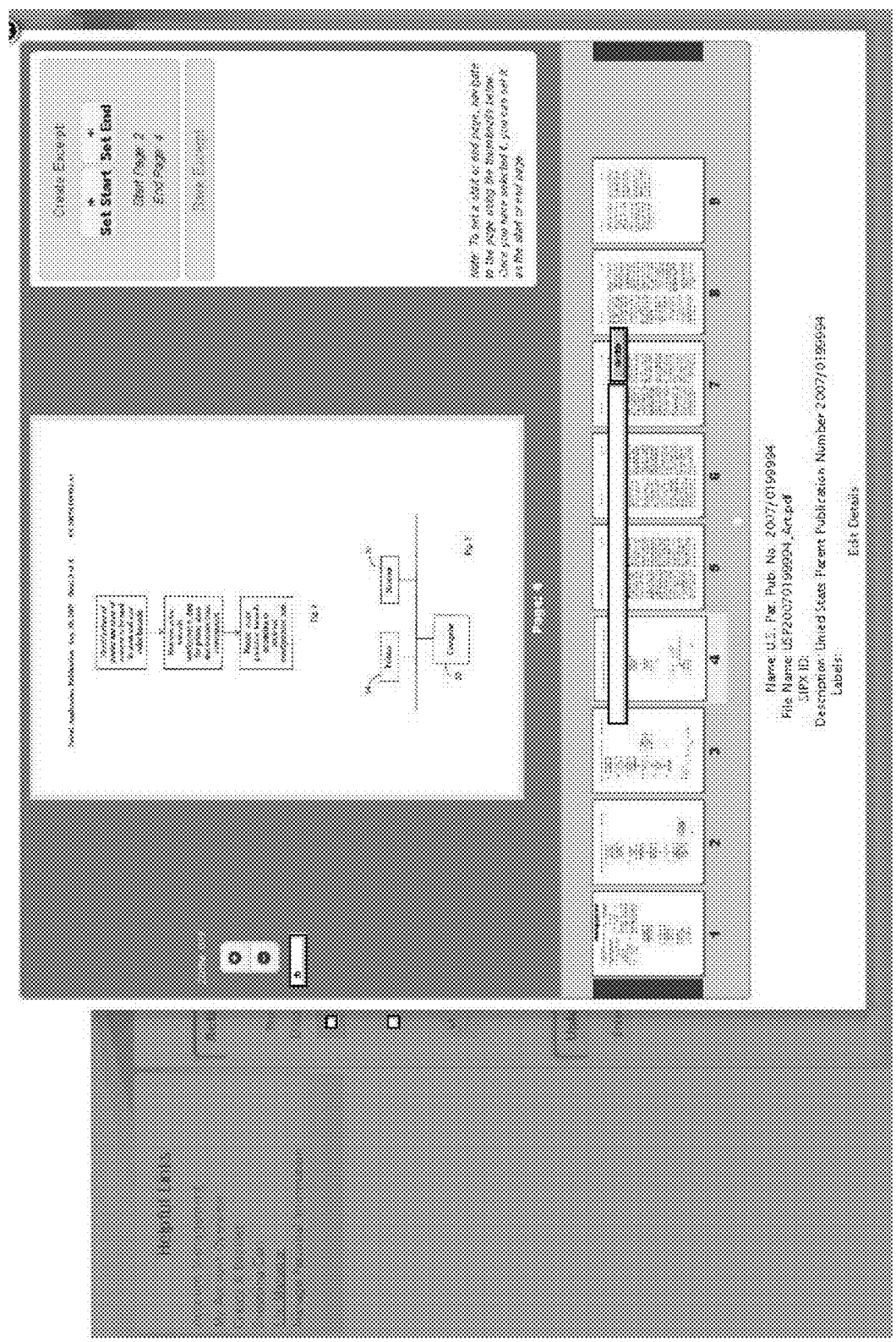

Moreover, the compiler at Step 134 shown in FIG. 3 may create an excerpt of the file by clicking on the "Create Excerpt" button at the upper right corner of the page shown in FIG. 14, which will open a small interactive dialog box as shown in FIG. 15.

Referring to FIG. 15, all pages of the file are displayed as small thumbnail images with a scroll bar at the lower portion of the page. This is the "Display File Pages" Step S142 shown in FIG. 3.

Referring back to FIG. 15, the small interactive dialog box shown at the upper right portion of the page includes tool buttons for the compiler to select a page range for the excerpt to be created. This is the "Select Pages for the Excerpt" Step S144 shown in FIG. 3.

Referring back to FIG. 15, once a page range is selected, the compiler may click on the "Save Excerpt" button, and the excerpt will be saved as a separate file in the compiler's file folder but with all the necessary information from the original file, including the page range of the original file from which the excerpt is created. This is the "Save Excerpt as Separate File" Step S146 shown in FIG. 3.

Figure 16:
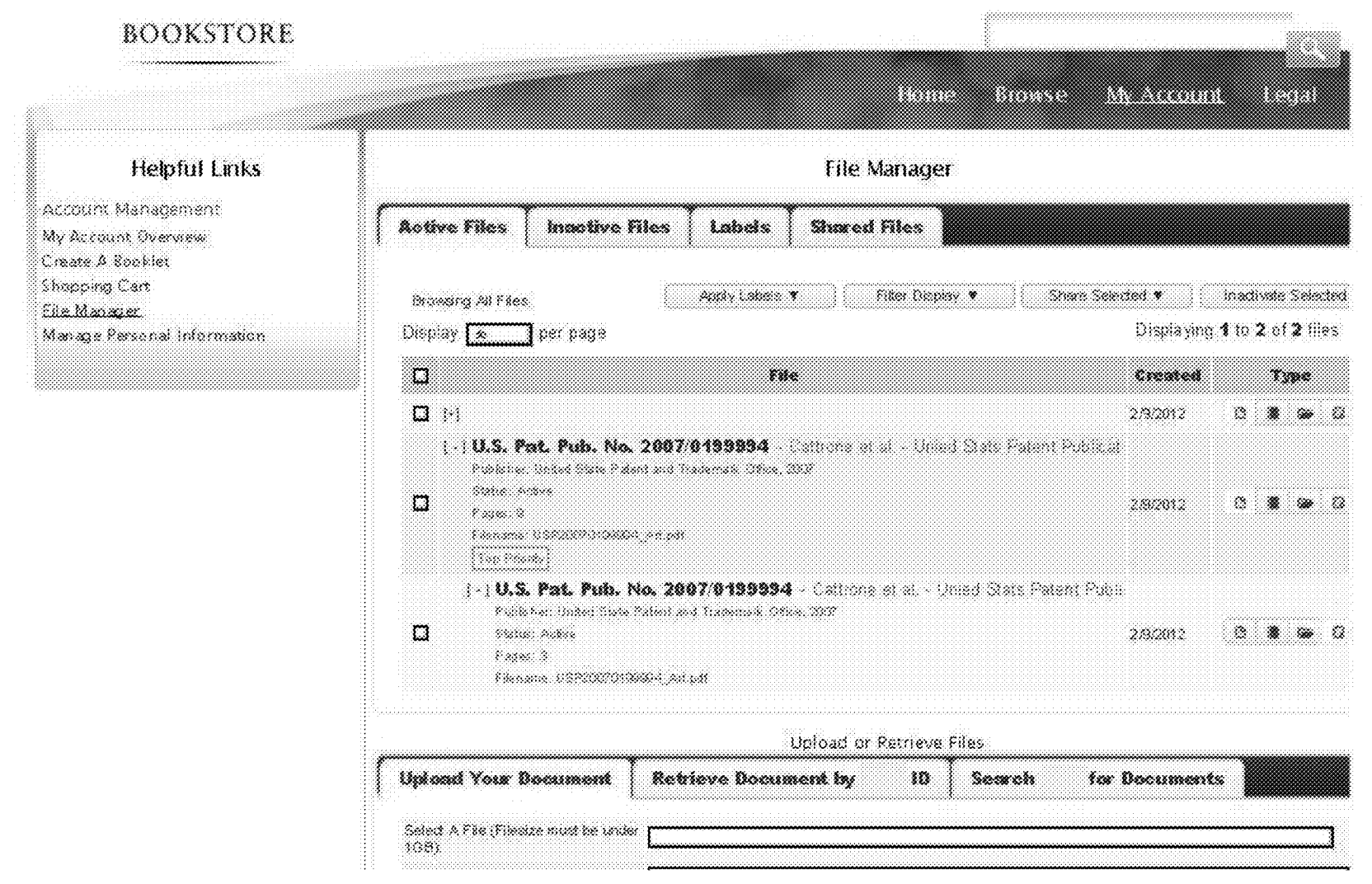

Referring to FIG. 16, there is shown an active file list including the new file from the excerpt. Since the excerpt file is created from the original file, it is listed one-level lower in the tree-type display scheme so that if the compiler clicks on the small minus sign in front of the original file (which is the file that has the entire original contents including the portion that is excerpted therefrom), the extended displays of the original file and the excerpt file will collapse at the same time into two separate one-line displays. This is the "List Excerpt File under Original File" Step 148 shown in FIG. 3. It is understood that this is only a preferred way of displaying the excerpt file, which may be displayed in other ways such as not under the original file in a tree-type display scheme.

Referring back to FIG. 16, in this example, both the original 9-page file and the newly generated 3-page excerpt file are listed, and each can be independently activated/ inactivated, labeled or shared. Their file types can also be independently set and changed. This is the "Manage Original and Excerpt Files Independently" Step 152 shown in FIG. 3.

A compiler's well managed file folder is in a sense like a small personal "library" of the compiler. The library contains articles with metadata that may be used to retrieve correct intellectual property (IP) rights such as copyrights. All necessary IP rights will be obtained by the online platform before the articles are used, e.g., printed in a booklet ordered and purchased by the readers. The original articles in the library may have pricing information as well. The price of an article may be based on a number of factors, e.g. the number of pages, membership or affiliation of the compiler and/or the readers, etc. The metadata and other information of the articles may be sent to the copyright management center for calculating the price of the articles.

When an excerpt is created from an original article, the metadata and other information such as the pricing information associated with the original article are also attached to or otherwise associate with the excerpt file, wherein some of the metadata or information may remain the same as the original file, such as the document ID, author/publisher/year, etc., with necessary changes in other information such as the page range and pricing. This is the "Attached Metadata to Excerpt File" Step 154 shown in FIG. 3. The metadata and other information so attached to or associate with the excerpt file may be used for calculating the price of the booklet that contains the excerpt file.

Referring back to FIG. 3, another important task that a compiler may perform at online platform is the generation of booklets, which is also a part of a computer-implemented method for generating and printing compilations of works in accordance with an embodiment of the present invention. At Step 160 the compiler may create a new booklet by clicking on the "Create A Booklet" link at the left portion of the page shown in FIG. 5 or any other page where such a link is provided. Once a booklet is generated, it may be purchased and printed in hard copies or otherwise delivered in electronic copies.

The above described process may be implemented by a computer software program. The present invention also provides a computer program product that includes a computer usable non-transitory medium (e.g. memory or storage device) having a computer readable program code embedded therein for controlling a data processing apparatus, the computer readable program code configured to cause the data processing apparatus to execute the above described process.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. A method for managing files for producing a compilation of works, comprising the steps of:
   displaying, using a user interface (UI) of a server, contents of a complete file saved in a file storage of the server, where the complete file includes multiple pages and is associated with copyright metadata, wherein the copyright metadata is metadata relating to copyright of a work represented by the complete file and includes one or more of a document ID, an author, a publisher, and a year of publication of the work;
   selecting, via the UI of the server, a portion of the complete file as an excerpt, the excerpted portion corresponding to a page range of the complete file, and saving the excerpt as an excerpt file in the file storage of the server, wherein the excerpt file is a separate file from the complete file and contains only the excerpted portion;
   attaching derived copyright metadata to the excerpt file, the derived copyright metadata being derived from the copyright metadata associated with the complete file and modified based on the page range of the complete file that form the excerpt;
   displaying, using another user interface (UI) of the server, a list of files, including listing the excerpt file in a same tree-type display scheme under the complete file; and
   displaying, using the other UI of the server that lists the excerpt file and the complete file in the tree-type display scheme, a plurality of input tools for independently managing the complete file and the excerpt file for producing the compilation of works, including displaying one or more input tools including check boxes, icons or buttons for: activating or deactivating the complete file and the excerpt file independently, setting or changing file types of the complete file and the excerpt file independently, or sharing or not-sharing the complete file and the excerpt file independently.

2. The method of claim 1, wherein the step of selecting a portion of the complete file as an excerpt file further comprises a step of selecting a page range of the complete file as the separate excerpt file.

3. The method of claim 1, wherein the complete file is further associated with other information.

4. The method of claim 3, further comprising the step of attaching the other information associated with the complete file to the excerpt file.

5. The method of claim 4, further comprising the step of modifying one or more parts of the copyright metadata and other information attached to the excerpt file to match the excerpt file.

6. A computer program product comprising a non-transitory computer usable medium having a computer readable code embodied therein for controlling a data processing apparatus, the computer readable program code configured to cause the data processing apparatus to execute a process for managing files for producing a compilation of works, the process comprising the steps of:
   displaying, using a user interface (UI) of a server, contents of a complete file saved in a file storage of the server, where the complete file includes multiple pages and is associated with copyright metadata, wherein the copyright metadata is metadata relating to copyright of a work represented by the complete file and includes one or more of a document ID, an author, a publisher, and a year of publication of the work;
   selecting, via the UI of the server, a portion of the complete file as an excerpt, the excerpted portion corresponding to a page range of the complete file, and saving the excerpt as an excerpt file in the file storage of the server, wherein the excerpt file is a separate file from the complete file and contains only the excerpted portion;
   attaching derived copyright metadata to the excerpt file, the derived copyright metadata being derived from the copyright metadata associated with the complete file and modified based on the page range of the complete file that form the excerpt;

displaying, using another user interface (UI) of the server, a list of files, including listing the excerpt file in a same tree-type display scheme under the complete file; and displaying, using the other UI of the server that lists the excerpt file and the complete file in the tree-type display scheme, a plurality of input tools for independently managing the complete file and the excerpt file for producing the compilation of works, including displaying one or more input tools including check boxes, icons or buttons for: activating or deactivating the complete file and the excerpt file independently, setting or changing file types of the complete file and the excerpt file independently, or sharing or not-sharing the complete file and the excerpt file independently.

7. The computer program product of claim 6, wherein the step of selecting a portion of the complete file as an excerpt file further comprises a step of selecting a page range of the complete file as the separate excerpt file.

8. The computer program product of claim 6, wherein the complete file is further associated with other information.

9. The computer program product of claim 8, wherein the process further comprises the step of attaching the other information associated with the complete file to the excerpt file.

10. The computer program product of claim 9, wherein the process further comprises the step of modifying one or more parts of the copyright metadata and other information attached to the excerpt file to match the excerpt file.

* * * * *